(12) United States Patent
Andre

(10) Patent No.: US 7,967,300 B2
(45) Date of Patent: Jun. 28, 2011

(54) HYDROSTATICALLY ACTUATED WORKHOLDING APPARATUS WITH HIGH EXPANSION AND RECOVERY SLEEVE

(75) Inventor: William M. Andre, Rochester Hills, MI (US)

(73) Assignee: Hydra-Lock Corporation, Mt. Clemens, MI (US)

( * ) Notice: Subject to any disclaimer, the term of this patent is extended or adjusted under 35 U.S.C. 154(b) by 1244 days.

(21) Appl. No.: 11/601,153

(22) Filed: Nov. 17, 2006

(65) Prior Publication Data
US 2008/0116649 A1 May 22, 2008

(51) Int. Cl.
*B23B 31/00* (2006.01)
(52) U.S. Cl. ............. 279/2.08; 279/2.22; 279/4.03; 279/4.06; 279/4.11
(58) Field of Classification Search ....... 279/2.06–2.08, 279/2.22, 4.01, 4.03, 4.06, 4.11; *B23B 31/00*
See application file for complete search history.

(56) References Cited

U.S. PATENT DOCUMENTS

| | | | | |
|---|---|---|---|---|
| 2,567,471 A * | 9/1951 | Collgert et al. | ............ | 279/4.03 |
| 2,797,603 A * | 7/1957 | Atherholt et al. | ............ | 82/169 |
| 2,826,420 A * | 3/1958 | Klingler | ............ | 279/4.03 |
| 3,034,408 A * | 5/1962 | Kampmeier | ............ | 409/231 |
| 3,250,542 A * | 5/1966 | Winnen et al. | ............ | 279/2.08 |
| 3,335,569 A * | 8/1967 | Atherholt, Sr. | ............ | 60/583 |
| 3,378,902 A * | 4/1968 | Hoexter | ............ | 492/4 |
| 3,388,917 A * | 6/1968 | Winnen et al. | ............ | 279/4.03 |
| 3,516,681 A * | 6/1970 | Cox et al. | ............ | 279/4.02 |
| 3,542,354 A * | 11/1970 | Fitzpatrick | ............ | 269/22 |
| 3,592,482 A * | 7/1971 | Better et al. | ............ | 279/4.06 |
| 3,602,521 A * | 8/1971 | Uhtenwoldt et al. | ........ | 279/4.06 |
| 3,677,559 A * | 7/1972 | Andre et al. | ............ | 279/4.03 |
| 3,679,219 A * | 7/1972 | Cameron | ............ | 279/4.03 |
| 3,762,730 A * | 10/1973 | Cameron | ............ | 279/2.07 |
| 4,114,909 A * | 9/1978 | Taitel et al. | ............ | 279/2.07 |
| 4,366,735 A * | 1/1983 | Dubois, Sr. | ............ | 82/169 |
| 4,958,969 A * | 9/1990 | Och | ............ | 409/234 |
| 5,030,048 A * | 7/1991 | Massa | ............ | 409/234 |
| 5,088,746 A * | 2/1992 | Dietz et al. | ............ | 279/4.06 |

(Continued)

FOREIGN PATENT DOCUMENTS

DE 3417430 A1 * 11/1985

(Continued)

OTHER PUBLICATIONS

C. D. J. Barras and K. A. Myers, NITINOL—Its Use in Vascular Surgery and Other Applications, Eur J Vasc Endovasc Surg vol. 19, Jun. 2000.

(Continued)

*Primary Examiner* — Eric A Gates
(74) *Attorney, Agent, or Firm* — Reising Ethington P.C.

(57) ABSTRACT

A workholding apparatus includes a body, and a workholding sleeve composed of metal and carried by the body. A fluid chamber receives a fluid between the body and the workholding sleeve. Under fluid pressure, the sleeve is radially displaceable and recoverable to a high degree. For example, the sleeve is radially displaceable to at least one percent in diameter with runout within about 0.03% of its diameter, and after release of fluid pressure repeatably recovers to within about 0.01% of its original relaxed diameter. In another example, when displaced under fluid pressure, the sleeve experiences substantially complete and repeatable strain recovery of at least about 2% of its overall cross-sectional area. Preferably, the sleeve is composed of Nitinol.

9 Claims, 3 Drawing Sheets

U.S. PATENT DOCUMENTS

| | | | |
|---|---|---|---|
| 5,286,042 A | | 2/1994 | Laube |
| 5,462,293 A | * | 10/1995 | Samelius et al. ............. 279/4.03 |
| 5,516,243 A | * | 5/1996 | Laube ........................ 408/239 R |
| 5,944,325 A | | 8/1999 | Schmeisl |
| 6,000,687 A | | 12/1999 | Andre |
| 6,015,154 A | | 1/2000 | Andre et al. |
| 6,077,003 A | | 6/2000 | Laube |
| 6,311,987 B1 | * | 11/2001 | Rinne et al. .................. 279/4.03 |
| 6,488,285 B1 | * | 12/2002 | Allard .......................... 279/4.03 |
| 6,938,903 B1 | * | 9/2005 | Haimer ........................ 279/4.03 |
| 7,563,061 B2 | * | 7/2009 | Gibbons et al. ............... 408/240 |
| 2002/0171208 A1 | * | 11/2002 | Lechot et al. .................. 279/9.1 |
| 2004/0262855 A1 | * | 12/2004 | Andre, Sr. ..................... 279/2.08 |
| 2005/0184472 A1 | * | 8/2005 | Huijbers et al. ............. 279/4.01 |
| 2007/0145692 A1 | * | 6/2007 | Herud .......................... 279/2.06 |
| 2007/0216113 A1 | * | 9/2007 | Schuster et al. ............. 279/2.08 |
| 2008/0179838 A1 | * | 7/2008 | Retzbach et al. ............. 279/2.08 |

FOREIGN PATENT DOCUMENTS

| | | |
|---|---|---|
| WO | WO 9426448 A1 * | 11/1994 |
| WO | WO 02/070177 A2 * | 9/2002 |

OTHER PUBLICATIONS

Peter J. Hall, Laser Welding Nitinol to Stainless Steel, Edison Welding Institute, 1250 Arthur E. Adams Dr., Columbus, OH, pp. 219-228.

A. Tuissi et al, CO2 Laser Welding of Niti/Ni-Based Alloys, Consiglio Nazionale delle Ricerche, Istituto per L'Energetica e le Interfasi, Italy, pp. 229-239.

Frank Sczerzenie, Consideration of the ASTM Standards for Ni-Ti Alloys, Special Metals Corporation, SMST-2004: Proceeding of the Second European Conference on Shape Memory.

* cited by examiner

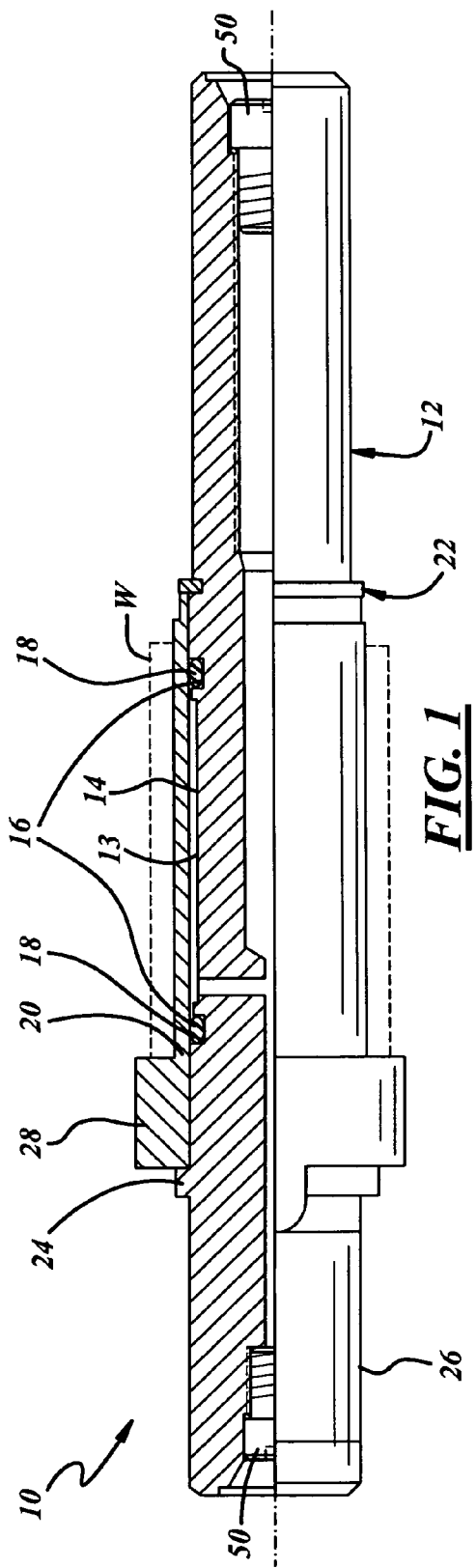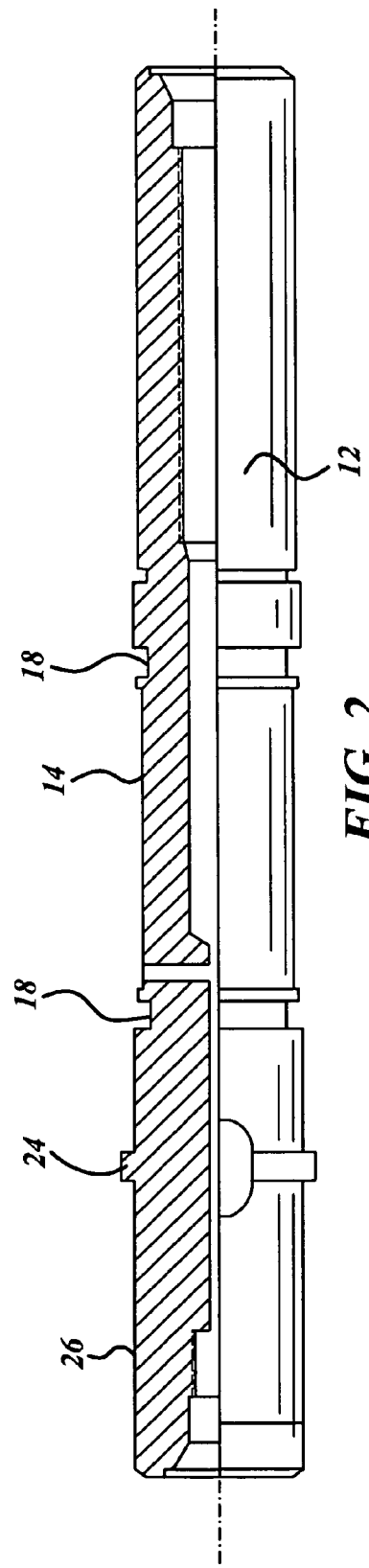

HYDROSTATICALLY ACTUATED WORKHOLDING APPARATUS WITH HIGH EXPANSION AND RECOVERY SLEEVE

FIELD OF THE INVENTION

The present invention relates generally to machine tools and, more specifically, to hydrostatic workholding apparatuses.

BACKGROUND OF THE INVENTION

Workholding apparatuses, or workholders, have been used for a number of years and are useful for holding solid and annular workpieces for subsequent machining or grinding. As is known, workholding apparatuses may be mechanically actuated or hydraulically actuated. In certain applications, workpieces formed from cast material have relatively non-uniform surfaces and significant dimensional variances in both inside and outside diameters. These workpiece variances may result in poor circumferential surface contact between the non-uniform workpieces and the smooth metal collet of the workholder. Furthermore, such workpiece size and shape variances often require large amounts of workholder expansion in order to achieve an adequate grip.

One workholding solution employs a circumferentially continuous steel sleeve to grip the workpiece. This solution requires relatively high hydraulic pressure on a workholder to achieve a suitable grip on the workpiece. For example, over 6,000 PSI of fluid pressure is required to achieve 0.001" expansion of a typical one-inch diameter steel sleeve. This result is achieved by increasing hydraulic-system size and hydraulic-system fittings, thereby increasing implementation costs. As a result of the high loads and pressures, permanent, non-rebounding indentations are left in the steel sleeve, thereby accelerating its replacement. Unfortunately, the high pressure can generate greater wear and failure of polymeric O-rings, possibly leading to fluid leaks. Also, a steel sleeve is expandable only a limited amount before being over expanded beyond a non-recoverable elastic limit of the sleeve.

Another common workholding solution relies on longitudinal slots cut out of, and circumferentially spaced about, a workholder sleeve. An exemplary apparatus comprises a hydrostatic workholder having a body partially defining a fluid chamber and carrying a deflectable metal sleeve formed with a plurality of circumferentially spaced and longitudinally extending slots. The apparatus also includes a flexible, polymeric bladder partially defining the fluid chamber to separate the fluid in the chamber from the sleeve. The longitudinal slots allow greater expansion of the sleeve and, thus, a more robust fit to parts with significant surface variances. But these sleeve openings allow foreign matter to enter the workholder, thereby increasing service frequency and device failure rates. And, the openings also create a weaker sleeve compared to solid sleeve workholders of similar thicknesses. Finally, under sufficiently high fluid pressures, the bladder may extrude through the openings in the sleeve.

Sleeves are most commonly fashioned from steel resulting in high durability after repeated use. But to achieve the optimum fit between workpiece and workholder, sleeves composed of metal-coated plastic have been implemented. This design provides a closer nexus between workpiece and workholder. But after many uses in high-performance operations, a decrease in gripping pressure can result. Moreover, while plastic sleeves are effective at gripping a workpiece, after frequent deflections, the ability of plastic to maintain its original shape decreases over time.

SUMMARY OF THE INVENTION

In one form, a workholding apparatus includes a body and a workholding sleeve composed of metal and carried by the body. A fluid chamber receives a fluid between the body and the workholding sleeve. To firmly hold the workpiece on the workholder, fluid under pressure is provided to the fluid chamber from an external or internal source through fluid passages in the body. The force of the pressurized fluid radially displaces the sleeve into firm engagement with a circumferential surface of the workpiece to firmly hold and accurately locate the workpiece. To remove the workpiece, the pressure of the fluid supplied to the fluid chamber is relieved, thereby relaxing the sleeve. The sleeve is radially displaceable and recoverable to a relatively high degree. For example, the sleeve is radially displaceable to at least one percent in diameter with runout within about 0.03% of its diameter, and after release of fluid pressure recovers to within about 0.01% of its original relaxed diameter. In another example, when displaced under fluid pressure, the sleeve experiences substantially complete and repeatable strain recovery of at least about 2% of its overall cross-sectional area. Preferably, the sleeve is composed of Nitinol.

Objects, features and advantages of this invention include providing a workholder that may permit a large range of expansion and contraction while requiring less hydraulic pressure than existing designs, has a secure and robust grip on a workpiece, is less susceptible to contamination of the workholder mechanical parts, firmly holds and locates workpieces formed of cast material, conforms to a workpiece which is out of round, holds an out-of-round part without rounding it, dampens vibrations during the machining process, permits a better finish on the part machined, repeatably and reliably holds and locates workpieces, reliably centers workpieces, uses a sleeve which may be formed of different thicknesses, accommodates different sized parts, enables displacement of the sleeve radially inwardly or radially outwardly, is of a relatively simple design and economical manufacture and assembly and has a relatively long, useful life in service. Of course, other objects features and advantages will be apparent in view of this disclosure to those skilled in the art. Various other workholders embodying the invention may achieve more or less than the noted objects, features or advantages.

BRIEF DESCRIPTION OF THE DRAWINGS

These and other objects, features and advantages of this invention will be apparent from the following detailed description, appended claims, and accompanying drawings in which:

FIG. 1 is a partially sectioned and assembled view of one embodiment of an arbor;

FIG. 2 is a side view partially in section of a body of the arbor in FIG. 1;

DETAILED DESCRIPTION OF PREFERRED EMBODIMENTS

Figure 3:
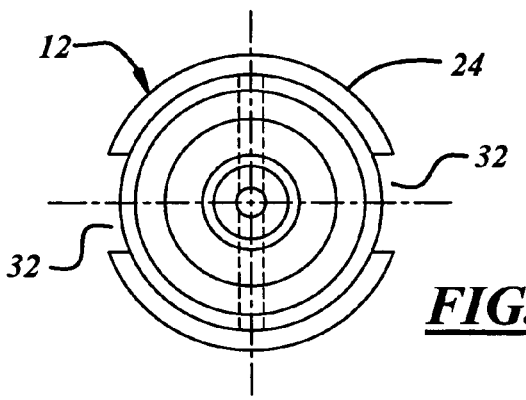
FIG. 3 is a rear end view of the body in FIG. 2.

Referring in more detail to the drawings, FIG. 1 illustrates a hydrostatic workholder, and more specifically, an arbor 10 for holding a workpiece W. The arbor 10 includes a body 12 for mounting to a machine tool (not shown) and for carrying other parts of the arbor 10. An external, circumferentially continuous annular recess 14 in the outer surface of the body 12 partially defines a fluid chamber 13 that can be sealed by sealing members such as resilient polymeric rings 16 or O-rings, that are disposed within circumferential grooves 18 in the body 12. The arbor 10 also includes an expansible workholding sleeve 20 carried by the body 12 for engaging the workpiece W, whereby the polymeric rings 16 are received between the body 12 and the sleeve 20. A retaining ring 22, such as a snap ring, is carried by the body 12 for axially retaining the sleeve 20.

In general, fluid pressure is applied in any suitable manner through the body 12 and against the sleeve 20, which expands into engagement with the workpiece W. For example, threaded screws 50 received in the ends of the body 12 and in communication with the fluid chamber 13 provides one or more pistons which can be advanced or retracted by rotation of the screws 50 to apply direct pressure on the fluid in the fluid chamber 13. The screws 50 may be sealingly engaged to the body 12 in any suitable manner including using O-rings (not shown) or the like. Alternatively, fluid pressure may be provided by an external pressurized fluid supply system (not shown), which may include a pressurized fluid supply conduit (not shown) in communication with the fluid chamber 13 through the body 12 and through a machine spindle in any suitable manner.

FIGS. 2 and 3 illustrate the body 12 of the arbor 10. The body 12 is substantially cylindrical in shape having a shoulder 24 adjacent a shank 26. The shank 26 provides a means for affixing the workholder apparatus to a machine tool. As shown in FIG. 3 the shoulder 24 may include axially extending slots 32 for receiving and engaging tabs 30 of the sleeve 20 (shown in FIGS. 4 and 5). The body 12 is preferably composed of heat treated SAE 6150 steel, but may be composed of any other suitable material.

Figure 4:
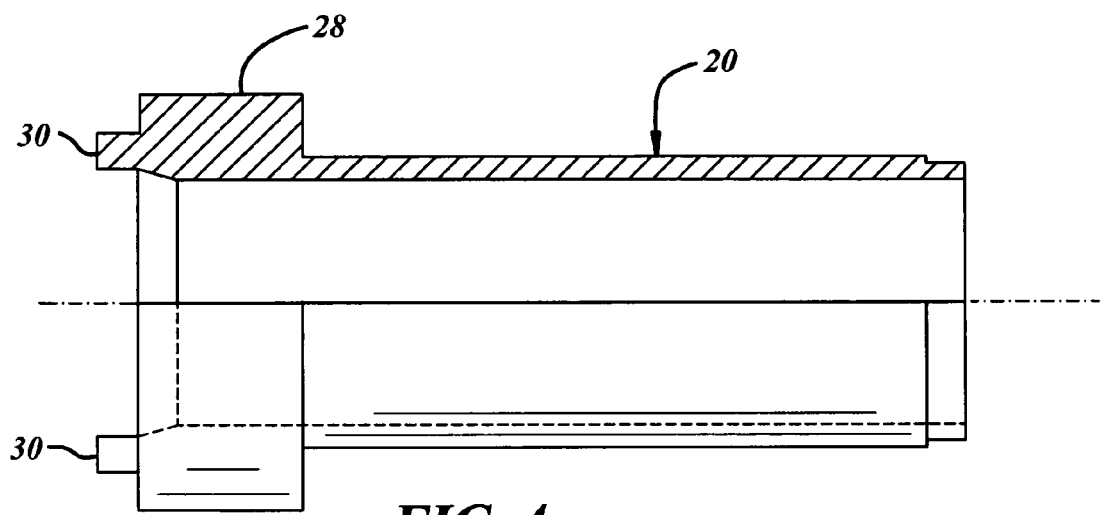
FIG. 4 is a side view partially in section of a workholding sleeve of the arbor in FIG. 1.
Figure 5:
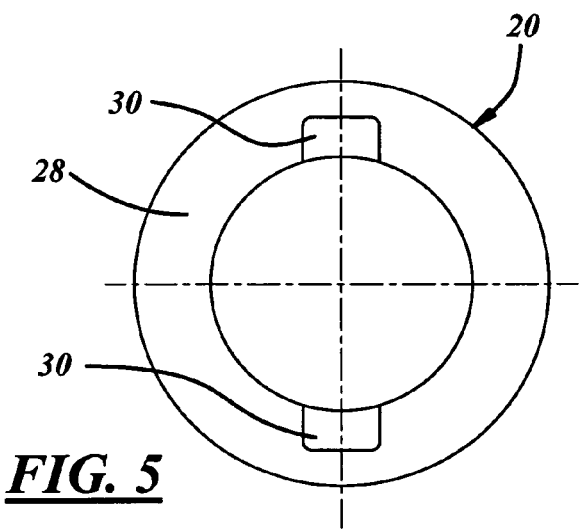
FIG. 5 is an end view of the sleeve in FIG. 4.

FIG. 4 illustrates the sleeve 20 of the arbor 10. The sleeve 20 is generally tubular or cylindrical and is a relatively high-expansion sleeve preferably composed of Nitinol (Nickel Titanium Naval Ordinance Laboratory), preferably Type 508 Nitinol. The sleeve 20 can be machined from bar stock, preferably using carbide tools and machining parameters similar to those used in machining titanium. As seen in FIGS. 4 and 5, the sleeve 20 includes a radially outwardly extending flange 28 with axially extending tabs 30 for engaging the slots 32 in the shoulder 24 of the body 12 (FIG. 3) to limit or prevent rotational slippage of the sleeve 20 in relation to the body 12. As shown in FIG. 1, the sleeve 20 is trapped on the body 12 between the retaining ring 22 and the shoulder. The use of Nitinol material allows the sleeve 20 to significantly expand from its relaxed state ensuring both a close fit with the workpiece W and constant and circumferentially continuous contact with the polymeric seals 16.

Nitinol is a nickel-titanium inter-metallic compound invented by the U.S. Navy in the early 1960's. Type 508 Nitinol is composed of approximately 55.8% Nickel and 44.2% Titanium. The workholding sleeve 20 material is not limited solely to Nitinol 508 and may be composed of any of various Nitinol alloys. But Nitinol, and particularly Type 508 Nitinol, has many properties that are unrecognized as being of potential value in workholders. It can be polished to an extremely smooth finish, is naturally hard and can be heat treated to a relatively high hardness, is nearly immune to corrosion from most common corrosive agents, has high yield strength and toughness even at elevated temperatures, and elastically recovers its relaxed shape and size even after being highly strained.

In assembly, the polymeric rings 16 are stretched over the mandrel portion of the body 12 and positioned into the circumferential grooves 18, as shown in FIGS. 1 and 2. The sleeve 20 is coaxially assembled over the end of the mandrel portion in abutment with shoulder 24 of the mandrel portion of the body 12. The sleeve 20 may be loosely fit to the body 12, or press fit to the body 12 such as with 0.0005" to 0.001" diametral interference between the sleeve 20 and the body 12. Thereafter, the sleeve 20 may be left unground or may be cleanup ground such as with an aluminum oxide 220 grit grinding wheel. Assembling the sleeve 20 over the body 12 places the sleeve 20 into sealing engagement with the resilient polymeric rings 16, thereby compressing the rings 16 and sealing the fluid chamber 13. Finally, the retaining ring 22 is assembled over the end of the sleeve 20. Accordingly, the mandrel portion of the body 12 carries thereon the various assembled components described above to constitute the arbor 10.

It is also contemplated that the sleeve 20 could be sealingly attached to the body 12 by replacing the O-rings 16 and grooves in favor of circumferentially continuous welds (not shown) in any suitable location(s). In other words, the sleeve 20 can be welded to the body 12 in one or more locations to seal the fluid chamber 13, according to any suitable welding techniques. In this case, one or more circumferentially continuous welds could serve as sealing members for the workholding apparatus. Those skilled in the art will recognize that many suitable techniques may be used to weld Nitinol to steel, including that described in U.S. Pat. No. 6,875,949, which is incorporated herein by reference in its entirety.

In use, a workpiece W is disposed over the outer surface of the sleeve 20 until the workpiece W engages the flange 28 of the sleeve 20. The workpiece W may be a cast iron sleeve, a gear blank, or any other workpiece suitable for mounting on the arbor 10. A cast iron workpiece such as a cylinder liner for an engine has relatively rough surfaces and significant variations in inside and outside diameter. Thus, a relatively large displacement of the sleeve 20 is desirable to firmly hold and accurately locate such workpieces on the arbor 10.

To firmly hold the workpiece W on the arbor 10, those skilled in the art will recognize that fluid under pressure is provided from an external or internal source through fluid passages of the body 12 into the fluid chamber 13. The force of the pressurized fluid radially outwardly displaces the resilient sleeve 20 into firm engagement with an inner surface of the workpiece W, thereby firmly holding and accurately locating the workpiece W for machining operations to be performed thereon. To remove the workpiece W after machining operations, the pressure of the fluid supplied to the fluid chamber 13 is decreased and the sleeve 20 relaxes and radially contracts. Thus, the sleeve 20 acts as an engagement member to expand and radially outwardly engage the workpiece W.

The sleeve is radially displaceable and recoverable to a relatively high degree, especially when compared to conventional steel workholding sleeves. The fluid pressure applied to expand the sleeve 20 into engagement with the workpiece W is relatively low compared to conventional workholders equipped with sleeves composed of steel such as SAE 6150 or SAE 4140. For example, less than 600 PSI may be used to expand a one inch diameter sleeve 20 about 0.0005" to 0.001". This is substantially less fluid pressure than the 6,000 PSI required to expand an SAE 6150 steel sleeve about the same amount. Moreover, only about 1,500 PSI is used to expand a one inch diameter sleeve about 0.0015" to 0.0030"

whereas 2,500 PSI is required to expand a one inch diameter SAE 6150 steel sleeve less than half that amount.

And, surprisingly, despite the highly flexible nature of the sleeve 20, the accuracy of the workholder 10 is comparable to the accuracy of conventional workholders with steel sleeves. For example, a conventional one inch steel sleeve actuated 0.005" over its diameter tends to average about 0.0002" Total Indicator Runout (T.I.R.). T.I.R. can be measured over the sleeve-to-workpiece engagement length of a sleeve. In comparison, a one inch arbor with sleeve 20 is expandable twice as much, or 0.010", yet tends to yield comparable T.I.R. of about 0.00015" to 0.0004" and preferably within about 0.0003". In other words, the sleeve 20 can be expanded in size from its original relaxed diameter at least about one percent in diameter, or at least about 2% of its overall cross-sectional area, and has runout within about 0.0003" T.I.R or about 0.03% of its diameter. The sleeve 20 can be repeatably expanded and relaxed according to these fluid pressures and displacements. After being expanded, the sleeve 20 substantially recovers its original relaxed diameter, to within about 0.00 to 0.01% of its original relaxed diameter. Thus, the sleeve 20 can be expanded at least double the magnitude compared to a conventional steel sleeve, but with similar or better T.I.R. performance in its expanded and recovered relaxed states.

Moreover, the sleeve 20 enjoys substantially complete and repeatable strain recovery of up to about 6% of its overall cross-sectional area or about 3% of its overall diameter. Substantially complete strain recovery means that the sleeve 20 substantially recovers its diameter in its relaxed state after being expanded. Similarly, substantially repeatable strain recovery means that the sleeve 20 can recover its relaxed state diameter after a plurality of cycles of expansion and relaxation.

Further, the sleeve 20 also enjoys substantially complete strain recovery of up to about 8% of its overall cross-sectional area or about 4% of its overall diameter, for at least one cycle. In a conventional workholder, a one inch diameter steel sleeve is known to be expandable to a maximum of only about 0.005" before exceeding the non-recoverable elastic limit of the sleeve. In contrast, the sleeve 20 at one inch in diameter is expansible about 0.040" or more before exceeding the non-recoverable elastic limit of the sleeve 20.

Although sleeves of one inch diameter and about 0.090" wall thickness have been compared, it is contemplated that any suitable size sleeve could be used. In other words, the performance of a larger or smaller sleeve should be roughly proportional to that described with respect to the one inch diameter sleeve. Those skilled in the art will recognize that results will vary depending on the wall thickness of the particular sleeve, but should be relatively predictable for sleeves having typical wall thicknesses of between about six to twelve percent of their overall diameter, e.g. 0.060" to 0.120" for a one inch diameter sleeve. Moreover, while the sleeve 20 is preferably composed of Nitinol, it can instead be composed of any other suitable material that yields the above-described performance characteristics.

Figure 6:
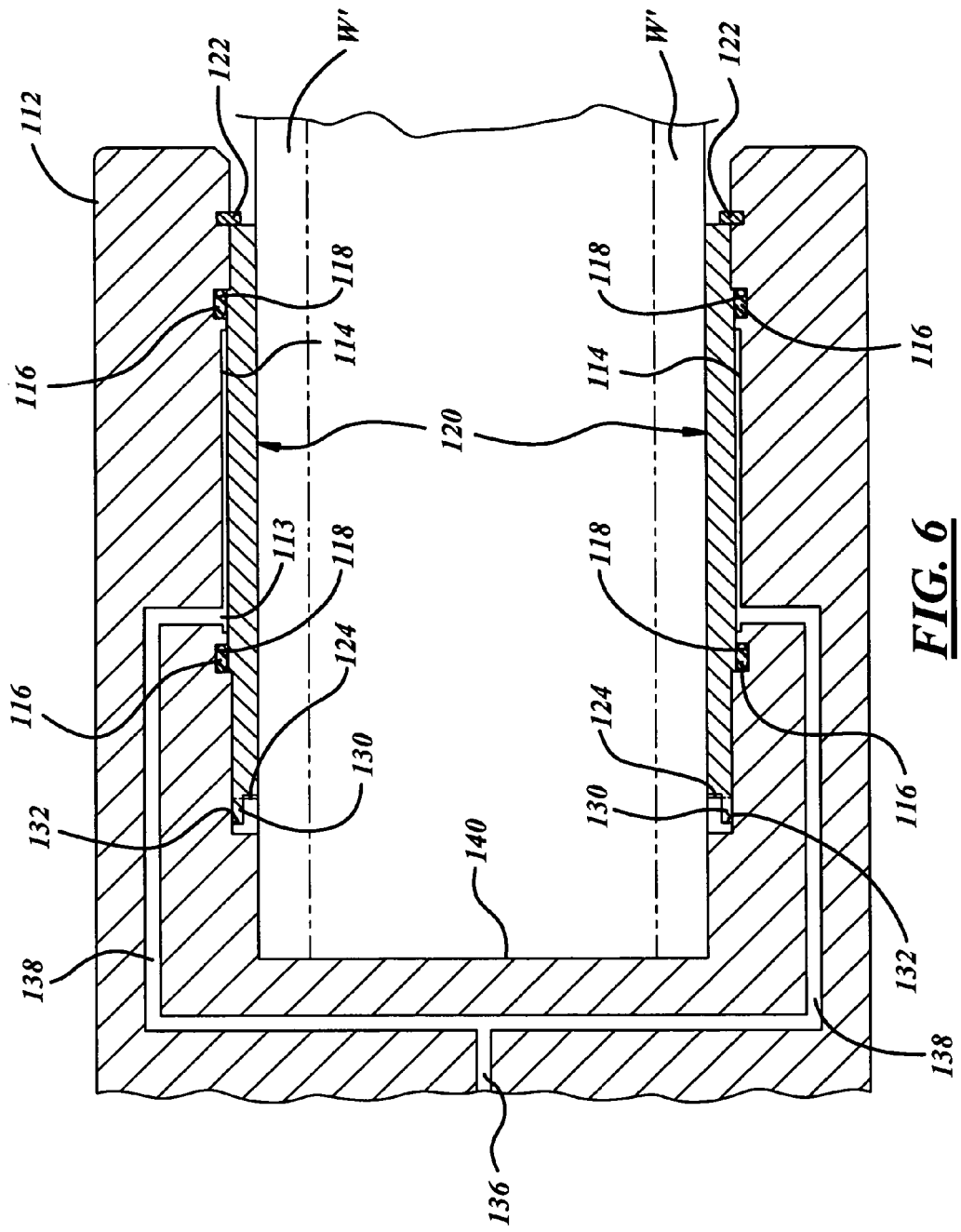
FIG. 6 is a fragmentary sectional view of a chuck.

FIG. 6 illustrates another presently preferred embodiment of a workholder. This embodiment is similar in many respects to the embodiment of FIGS. 1 through 5, and like numerals between the embodiments generally designate like or corresponding elements throughout the several views of the drawing figures. Additionally, the description of the previous embodiment is incorporated by reference and the common subject matter may generally not be repeated here. Moreover, while sleeve displacement of the previous embodiment was described in terms of sleeve expansion, those of ordinary skill in the art will recognize that sleeve displacement includes expansion and/or contraction.

FIG. 6 illustrates another hydrostatic workholder and more specifically, a chuck 110 for holding a workpiece W'. The chuck 110 includes a body 112 for mounting to a machine tool (not shown) and for carrying other components of the chuck 110. An internal circumferential recess 114 in the body 112 partially defines a fluid chamber 113 that is sealed by resilient polymeric rings 116, such as O-rings, that are disposed within circumferential grooves 118 in the body 112. The chuck 110 also includes a contractible high-expansion sleeve 120 and carried by the body 112 for engaging an exterior of the workpiece W'. The sleeve 120 also engages the polymeric rings 116 received between the body 112 and the sleeve 120. A retaining ring 122 is carried by the body 112 for axially retaining the sleeve 120 in the chuck 110. In general, fluid pressure is applied through the body 112 and against the sleeve 120, which radially contracts or is forced radially inward into engagement with the workpiece W'.

The body 112 is substantially a cylindrical tube or socket portion within which workpieces W' are to be received. The body 112 includes an inner cylindrical recess 114 partially defining a fluid chamber. The fluid chamber 113 is additionally defined by the sleeve 120 and polymeric rings 116 held by the one or more annular grooves 118 in the body 112. The body 112 is preferably composed of heat treated SAE 6150 steel, but may be composed of any other suitable material.

The sleeve 120 is generally tubular or cylindrical and preferably composed of Type 508 Nitinol. As illustrated in FIG. 6, tabs 130 can axially extend from the sleeve 120 and be received in and engage corresponding slots 132 in the body 112, thereby limiting or preventing rotational slippage of the sleeve 120 in relation to the body 112. The unique material properties allow the sleeve 120 to significantly contract from its relaxed state ensuring both a close fit with the workpiece W' and constant contact with the polymeric rings 116. The sleeve 120 facilitates a large contraction range in operation.

In assembly, the resilient polymeric rings 116 are inserted within the body 112 and positioned into the circumferential grooves 118. The sleeve 120 is then inserted coaxially within the body 112 in abutment with a shoulder 124 of the body 112 and in sealing engagement with the polymeric rings 116 sealing the fluid chamber 113. Accordingly, the socket portion of the body 112 carries the various assembled components described above constituting the chuck 110.

In use, a workpiece W' is disposed within the sleeve 120 until the workpiece W' engages an inside end 140 of the body 112. The workpiece W' may be a cast iron sleeve, a gear blank, or any other workpiece suitable for mounting in a chuck. A cast iron sleeve such as a cylinder liner for an engine has relatively rough surfaces and significant variations in inside and outside diameter. Thus, a relatively large displacement of the sleeve 120 is desired to firmly hold and accurately locate such workpieces in the chuck 110.

To firmly hold the workpiece W' in the chuck 110, fluid under pressure is provided from an external or internal source (not shown) through the main fluid passage 136 and branch fluid passage 138 into the fluid chamber 113. The force of the pressurized fluid radially inwardly displaces the resilient sleeve 120 into firm engagement with an outer surface of the workpiece W', thereby firmly holding and accurately locating the workpiece W' for machining operations to be performed thereon. To remove the workpiece W' after machining operations, the pressure of the fluid supplied to the fluid chamber 113 is decreased, thereby decreasing the pressure of the fluid in the fluid chamber 113 so that the sleeve 120 relaxes and expands to its at rest state. Thus, the sleeve 120 acts as an engagement member to radially inwardly engage the workpiece W'.

The workholder may be carried in any suitable configuration including an arbor or a chuck and including a fluid actuated or mechanically actuated sleeve. For example, exemplary hydrostatic workpiece arbors and chucks are disclosed in U.S. patent application Publication 2006/0131820, which is assigned to the assignee hereof and incorporated herein by reference in its entirety. In another example, an exemplary mechanically actuated workpiece holder is disclosed in U.S. patent application Publication 2006/0097463, which is assigned to the assignee hereof and incorporated herein by reference in its entirety.

The workholder embodiments described above incorporate high-expansion workholding sleeves to simultaneously simplify and improve the performance of the workholders. First, the workholders do not require the use of difficult-to-machine collets or corresponding use of an intermediate bladder member. Second, the workholder sleeves can expand or contract considerably more under relatively less fluid pressure compared to solid sleeves composed of steel. Third, the sleeves are simpler in construction than metal-coated plastic sleeves, wear better than metal-coated plastic sleeves and maintain their shape better than metal-coated plastic sleeves. Fourth, despite having highly expandable sleeves, the workholders do not leak. In other words, use of the high-expansion sleeves yielded the surprising result that the workholders embody, in one design, the beneficial characteristics of the various previous workholder approaches without their significant limitations and drawbacks.

As used in this specification and claims, the terms "for example," "for instance," and "such as," and the verbs "comprising," "having," "including," and their other verb forms, when used in conjunction with a listing of one or more components or other items, are each to be construed as open-ended, meaning that the listing is not to be considered as excluding other, additional components, elements, or items. Moreover, directional words such as top, bottom, upper, lower, radial, circumferential, axial, lateral, longitudinal, vertical, horizontal, and the like are employed by way of description with reference to the orientation of the workholder embodiments shown in the drawings and are not limitations. Other terms are to be construed using their broadest reasonable meaning unless they are used in a context that requires a different interpretation. When introducing elements of the present invention or the embodiments thereof, the articles "a," "an," "the," and "the" are intended to mean that there are one or more of the elements.

Although the present invention has been disclosed in conjunction with a limited number of presently preferred exemplary embodiments and forms, many others are possible and it is not intended herein to mention all of the possible equivalent embodiments, forms and ramifications of the present invention. Other modifications, variations, forms, ramifications, substitutions, and/or equivalents will become apparent or readily suggest themselves to persons of ordinary skill in the art in view of the foregoing description. In other words, the teachings of the present invention encompass many reasonable substitutions or equivalents of limitations recited in the following claims. As just one example, the disclosed structure, materials, sizes, shapes, and the like could be readily modified or substituted with other similar structure, materials, sizes, shapes, and the like. Indeed, the present invention is intended to embrace all such forms, ramifications, modifications, variations, substitutions, and/or equivalents as fall within the spirit and broad scope of the following claims.

I claim:

1. A workholding apparatus comprising:
   a body;
   a nonpolymeric, circumferentially continuous, workholding sleeve composed of metal and carried by the body so as to engage a surface of a workpiece and radially displaceable under fluid pressure at least one percent in diameter and having runout within 0.03% of its diameter and is recoverable to within 0.01% of its original relaxed diameter after being displaced by said fluid pressure; and
   a fluid chamber for receiving a fluid between the body and the workholding sleeve.

2. The workholding apparatus of claim 1, wherein the workholding sleeve is composed of Nickel and Titanium.

3. The workholding apparatus of claim 2, wherein the workholding sleeve is composed of Nitinol.

4. The workholding apparatus of claim 3, wherein the workholding sleeve is composed of type SE 508 Nitinol.

5. The workholding apparatus of claim 1, wherein the fluid chamber is partially defined by a circumferentially continuous annular recess in an outer surface of the body, and wherein the workholding sleeve is press fit to the body over the fluid chamber.

6. The workholding apparatus of claim 1, further comprising at least one sealing member positioned between the workholding sleeve and the body wherein the at least one sealing member remains in contact with the workholding sleeve to create a seal as the workholding sleeve is radially displaced.

7. The workholding apparatus of claim 1, wherein the pressurized fluid exerts a radially outward force against the workholding sleeve for engagement with the workpiece.

8. The workholding apparatus of claim 1, wherein the workholding sleeve is expansible at least four percent of its diameter for at least one cycle before exceeding a non-recoverable elastic limit of the workholding sleeve.

9. The workholding apparatus of claim 1, including diametral interference between the workholding sleeve and the body.

* * * * *